United States Patent
Charugundla (10) Patent No.: US 9,800,635 B2
(45) Date of Patent: Oct. 24, 2017

(54) SYSTEM FOR SELECTIVELY DISPLAYING INFORMATION IN A SECURED MANNER AND METHOD THEREOF

(71) Applicant: Kent S. Charugundla, New York, NY (US)

(72) Inventor: Kent S. Charugundla, New York, NY (US)

(73) Assignee: C21 Patents, LLC, New York, NY (US)

( * ) Notice: Subject to any disclaimer, the term of this patent is extended or adjusted under 35 U.S.C. 154(b) by 164 days.

(21) Appl. No.: 13/961,688

(22) Filed: Aug. 7, 2013

(65) Prior Publication Data

US 2015/0047048 A1 Feb. 12, 2015

(51) Int. Cl.
*H04L 29/06* (2006.01)
*G06F 21/10* (2013.01)
*G06F 21/84* (2013.01)

(52) U.S. Cl.
CPC .............. *H04L 65/60* (2013.01); *G06F 21/10* (2013.01); *G06F 21/84* (2013.01); *G06F 2221/2133* (2013.01)

(58) Field of Classification Search
CPC ......... H04L 65/20; G06F 21/10; G06F 21/84; G06F 2221/2133
See application file for complete search history.

(56) References Cited

U.S. PATENT DOCUMENTS

| | | | | |
|---|---|---|---|---|
| 7,305,713 B1* | 12/2007 | Crance | ............................. | 726/33 |
| 7,975,019 B1* | 7/2011 | Green | ................ | G06Q 30/0241 |
| | | | | 705/14.4 |
| 8,112,310 B1* | 2/2012 | Yehoshua | .............. | G06Q 30/00 |
| | | | | 705/14.42 |
| 8,316,237 B1* | 11/2012 | Felsher | ................. | H04L 9/0825 |
| | | | | 380/282 |
| 8,640,166 B1* | 1/2014 | Craner | ............... | H04N 21/4826 |
| | | | | 725/37 |
| 8,788,816 B1* | 7/2014 | Spaulding | ............... | G06F 21/10 |
| | | | | 713/165 |
| 2002/0131364 A1* | 9/2002 | Virtanen | ............. | H04L 63/0227 |
| | | | | 370/230 |
| 2003/0078032 A1* | 4/2003 | Pei et al. | ....................... | 455/411 |

(Continued)

*Primary Examiner* — Michael Pyzocha
(74) *Attorney, Agent, or Firm* — Paul J. Sutton; Barry G. Magidoff (57) ABSTRACT

A communication system comprising a controlling server coupled to a controlled server via a socket communication channel to stream sensitive information to a desktop computer for viewing in a secured manner. The streamed information is not stored at the desktop. The controlling server streams the information to the desktop computer as long as the server is receiving a continuous uninterrupted flow of requests for information signals from the desktop computer. The user continuously depresses the mouse on the desktop to generate the continuous uninterrupted requests to view the sensitive information in a secure manner. The controlling server will immediately stop streaming the sensitive information and thus stop the display of the sensitive information upon detection of any interruption of the continuous transmission of request signals as would occur, for example, if the user were to unexpectedly leave the desktop unattended.

23 Claims, 4 Drawing Sheets

(56) References Cited

U.S. PATENT DOCUMENTS

| | | | |
|---|---|---|---|
| 2003/0212801 A1* | 11/2003 | Yang-Huffman | H04L 69/16 709/228 |
| 2003/0236991 A1* | 12/2003 | Letsinger | 713/200 |
| 2004/0098313 A1* | 5/2004 | Agrawal | G06Q 20/00 705/51 |
| 2005/0278764 A1* | 12/2005 | Barr | 725/100 |
| 2006/0117050 A1* | 6/2006 | John | H04M 3/42365 |
| 2006/0223502 A1* | 10/2006 | Doulton | 455/413 |
| 2006/0259931 A1* | 11/2006 | Kikkoji et al. | 725/100 |
| 2008/0059569 A1* | 3/2008 | Kanda | G06F 9/4443 709/203 |
| 2008/0126476 A1* | 5/2008 | Nicholas | G06Q 10/10 709/203 |
| 2008/0250021 A1* | 10/2008 | Boys | G06F 17/30256 |
| 2009/0106551 A1* | 4/2009 | Boren et al. | 713/158 |
| 2009/0221367 A1* | 9/2009 | Longley et al. | 463/32 |
| 2009/0249206 A1* | 10/2009 | Stahlberg | 715/716 |
| 2010/0240402 A1* | 9/2010 | Wickman et al. | 455/466 |
| 2011/0161806 A1* | 6/2011 | Stern | G06F 17/211 715/247 |
| 2012/0027265 A1* | 2/2012 | Black | G06F 3/03545 382/117 |
| 2012/0131471 A1* | 5/2012 | Terlouw | G06F 3/04883 715/741 |
| 2012/0139698 A1* | 6/2012 | Tsui et al. | 340/5.54 |
| 2013/0036374 A1* | 2/2013 | Melamed | G06F 3/04812 715/760 |
| 2013/0117152 A1* | 5/2013 | Mebed | G06Q 30/00 705/26.9 |
| 2013/0212470 A1* | 8/2013 | Karunamuni | G06F 17/24 715/243 |
| 2013/0241952 A1* | 9/2013 | Richman | G06F 17/21 345/619 |
| 2014/0006795 A1* | 1/2014 | Han | H04L 9/3231 713/186 |
| 2014/0028589 A1* | 1/2014 | Reilly | G06F 3/0416 345/173 |
| 2014/0033025 A1* | 1/2014 | Mukherjee | H04L 65/60 715/246 |
| 2014/0171034 A1* | 6/2014 | Aleksin et al. | 455/414.1 |
| 2014/0253465 A1* | 9/2014 | Hicks et al. | 345/173 |
| 2014/0331188 A1* | 11/2014 | Sandstrom | G06F 3/04883 715/863 |
| 2014/0344941 A1* | 11/2014 | Sibert | G06F 21/74 726/26 |

* cited by examiner

SYSTEM FOR SELECTIVELY DISPLAYING INFORMATION IN A SECURED MANNER AND METHOD THEREOF

FIELD OF THE INVENTION

The present invention generally relates to the field of telecommunications. In particular, the present invention relates to a computer system able to selectively display portions of secured information remotely to an intended viewer requesting the secured information.

BACKGROUND OF THE INVENTION

Communication technology has provided members of many societies throughout the world the ability to communicate with each other in various formats including voice, graphics, video, voice combined with video, text or any combination of these types of information. Social media websites allow communities throughout the world to speak to each other and share information instantaneously. Not surprisingly, privacy and security of information have become major concerns in many industries due to the prevalence of easily accessible devices, systems and communication networks. Also, the facility with which graphics, video and other types of information can be copied is another concern for industries. The most notable communication network, of course, is the Internet, which allows virtually anyone with the proper software installed on their computer and a connection to the World Wide Web to communicate with anyone else connected to the Web.

The Internet is a public network and arguably not under the control of any one government or organization. The conveyance of information over the Internet, especially sensitive, private and vital information, in a secured manner is a top priority for many industries. More specifically, the unauthorized and oftentimes illegal interception of private and sensitive information as it traverses the Internet has become increasingly worrisome for many industries. Also, the illegal and authorized copying (or downloading) of video, graphics and other types of information available on the Internet for viewing only is another major concern. Such information obtained illegally can be reproduced, for example, on a large scale allowing the copiers to profit from information they copied off the Internet.

Even though, in many cases, the information may be encrypted prior to being transmitted through the Internet, the information ultimately has to be decrypted at its intended final destination for viewing by the intended recipient. In many cases, the invasion of privacy, loss of security or the unauthorized interception of information occurs at the destination where the information is in its decrypted and/or original form and thus its vulnerability to interception, or viewing by unauthorized persons (or being accessed without permission) is at its greatest at that point.

Typically, sensitive information is displayed on a computer screen for viewing, ideally, by the intended party or parties and no one else. Unfortunately, this is not always the case. In many semi-public settings (e.g., bank teller's desk, medical doctor's office, hospital computer), a computer displaying private and sensitive information is often left unattended sometimes for a relatively long period of time. For example, a person's medical record can be displayed on a computer screen, or a person's bank account details or a person's academic record can all be viewed on a computer display. The information being displayed is typically temporarily stored in the computer's RAM (Random Access Memory) and can be easily copied with a removable portable storage device (commonly referred to as a "zip drive"). Also, a screenshot of the information can be printed or copied quite easily. Although, many desktop computers now have screen saver software, in many cases the screen saver software is not triggered until minutes after the computer is left unattended; in many cases, this is sufficient time for the displayed information to be copied or recorded.

Currently, there are privacy screens, which are detachably positioned over a computer display to prevent any peripheral viewing of information being displayed on a computer screen. These screens are designed so that only someone sitting directly in front of the computer screen can see the displayed information. However, these privacy screens can be easily detached from the computer, and from the discussion above, these privacy screens don't even begin to address the issues of unauthorized access to unattended information being displayed on computer screens.

Another problem is the issue of unauthorized access to the computer system wherein the sensitive information is stored. Similar to the displayed information, the information may be stored in its original format and not encrypted; that is, the information may be encrypted when it is about to be transmitted over the Internet. Regardless, how the information is stored (encrypted or in original format) the computer system may suffer from unauthorized access or be subject to software viruses that can cause great harm to the information and software residing in the computer system. Further, even when access to the information is allowed to the general public by the owner of the information, there is the concern of the illegal/unauthorized downloading or copying of the information (especially visual information such as video, and graphics) by anyone having access to the website at which the information is available.

SUMMARY OF THE INVENTION

The system of the present invention provides a system comprising a controlling server in communication with a controlled server via a socket communication channel allowing the controlling server to provide for display, in a secured manner, information in streaming format to the controlled server via the socket communication channel in response to continuous transmission of request signals transmitted by a user device to the controlled server via a communication channel where the controlled server relays the request signals to the controlling server via the socket communication channel. The controlled server also relays the information, in streaming format, from the controlling server to the user device via the communication channel allowing an operator of the user device to view the information in a secured manner. A user wishing to view the information operates the user device to generate the request signals for specific information. Prior to providing the requested information for viewing, the controlling server first authenticates the user device (and thus also the user operating the user device) to confirm that the user device is registered in accordance with requirements set by the controlling server or the entity or entities in control of and/or are owners of the controlling server and the controlled server.

After having authenticated the user device, the controlling server, during the continuous transmission of request signals, provides for the display of the requested information and said information is also provided for display at the controlled server, also in streaming format, via the socket communication channel. The controlled server relays, in streaming format, the displayed information to the user device, which displays said information, in streaming format, and thus allows the user to view the information in a secured manner; the information is relayed preferably in encrypted format. Any interruption of the continuous flow (i.e., continuous transmission) of request signals from the user device will cause the controlling server to immediately interrupt the transmission of the information to its display, to the display of the controlled server and thus to the display of the user device. After such an interruption, upon receiving authentication information and upon receiving the continuous transmission of request signals for the information within a first defined time period, the controlling server may resume the display of the requested information. If, however, the occurrence of continuous requests for information resumes after the first defined time period has elapsed, the controlling server may require that the user and user device proceed to a user registration and user device registration and/or authentication procedure before it resumes displaying the information. The entity or entities that own the controlling server and the controlled server may set the defined time period.

Also, during the display of the information on the user device, the user and/or any other operator of the user device are not able to copy, record or otherwise generate any type of facsimile of the displayed information with the use of the user device; this is because the controlled server and the controlling server allow a selected I/O (Input/Output) component of the user device—exclusive of any other I/O component of the user device—to transmit continuously the request for information (i.e., the request signals). Thus, once an I/O component is being used to transmit continuously one or more requests for the information, such component will be allowed to do so exclusive of the operation of any other I/O component of the user device. The controlling server, the user (during registration) or the controlled server may select the I/O component. The display of the information, in streaming format, at the user device is the result of streaming information that preferably may be video, audio, graphical and alphanumeric information. The user device does not store the streamed information it receives from the controlling server via the controlled server. The streaming of the information may be stopped when the continuous requests for information from the user device are interrupted as discussed above. That is, the interruption may result from the user inadvertently or intentionally stopping transmission of one or more requests for information or when the user (or another person) attempts to use another I/O component of the user device while the selected I/O component is being used to transmit continuously requests for information; in such a case, the user device will automatically stop transmitting the requests for information and in response, the controller will stop streaming the information to the controlled server and user device. Such an automatic stoppage of request transmissions may be based on processes or handlers residing on the user device that control operation of various I/O components of the user device. The automatic stoppage may be done by processes such as Java servlets or applets downloaded onto the user device by the controlling server during the registration process or immediately after the completion of the registration process. A resumption of the streaming of the information may occur after the controlling server initiated an authentication procedure.

In one embodiment of the present invention, the user device is a desktop computer or laptop computer. The information may be, for example, video information, textual information, graphical information, alphanumeric information or audio information. The controlled server may be in communication with the user device through a communication channel that is part of a communication network such as the Internet. Further, in this embodiment, the selected I/O component of the user device may be a mouse that controls the position of a cursor appearing on the display of the desktop computer or laptop computer. A user or organization gains access to the controlled server via a website on the Internet (residing on the controlled server) and registers for the service being provided by the controlled server and the controlling server. The controlling server may not be accessible via the Internet. A user—after having registered with the controlled server and after having identified the particular set of information he/she wants to be stored by the controlling server—will transfer (preferably in encrypted format) the information to the controlled server which relays said information to the controlling server. The user also will have provided user authentication information, user device information, user profile information to the controlled server to allow the controlling server to verify the user device and its authentication information before providing access to the secured information; other types of information may also be provided to the controlled server and thus ultimately to the controlling server. Upon receipt and storage of the information, the controlling server may uniquely identify the stored information and associate said information with the user device, the user information and the authentication information all of which having been provided during the registration process. The unique identifier(s) associated with specific stored information is provided to the user device and thus to the user after such information has been properly downloaded onto the system (i.e., onto the controller server and/or the controlling server). A unique identifier can be a number string, an alphanumeric string or any combination thereof.

After having registered, when a user wishes to view information (stored at the controlling server or information stored in memory accessible to the controlling server) he/she is able to do so by first identifying the information to the controlled server and providing authentication information to the controlled server to gain access to the identified information. The controlled server will relay this information to the controlling server. Upon verification by the controlling server of the authentication information received from the desktop computer or laptop computer, the user is prompted to operate the mouse in a specific manner to begin the viewing the information for which he/she requested. In particular, the user proceeds to continuously depress at least one of the buttons of the mouse or continuously depresses a depressible portion of the mouse while moving the mouse to cause the cursor to be located generally near the center of the display screen. The continuous depression of the mouse and its movement causing the cursor to be located generally near the center of the screen results in a continuous flow of information being transmitted from the desktop computer or laptop computer to the controlled server via a communication channel over the Internet; the transmitted information may contain the coordinates of the location of the cursor and information indicating that the mouse is being depressed. The communication channel between the user device and the controlled server may be implemented with the use of Java servlets that transport information between the user device (i.e., laptop or desktop computer) and the controlled server.

The flow of requests for information from the laptop or desktop computer is relayed to the controlling server via the controlled server using the socket communication channel. The controlling server then determines the location of the cursor and determines if such location is within the boundaries of the document for which the request is being made or within boundaries defined by the controlling server. That is, the controlling server determines the particular area of the screen that will be occupied by the document (when positioned at or near the center of the screen) and if the cursor is currently located within that area. If so, the controlling server will display or provide for display the image of the document resulting in such document being displayed by the controlled server. The controlled server, using applets or Java servlets, for example, then relays the image of the document to the user device (e.g., desktop computer or laptop computer). The document is displayed in this manner until the user moves the cursor to a left pointing or right pointing arrow indicating to the servers that he/she wants to view the preceding or successive page (if any) of the document. In this manner, the user can view an entire document and any other documents for which he/she has permission to view. The controlling server is continuously streaming the document to the user device via the controlled server as long as one of the buttons of the mouse is being depressed or a depressible portion of the mouse is being depressed. Generally speaking, the controlling server will transmit for viewing the information as long as a designated or selected I/O component of the user device is being continuously operated (to transmit continuous request signals) in a manner defined by the controlling server.

BRIEF DESCRIPTION OF THE DRAWINGS

The features and advantages of the present invention will become more apparent from the detailed description set forth below when taken in conjunction with the drawings in which like reference numbers indicate identical or functionally similar elements.

DETAILED DESCRIPTION

The description of the communication subsystem and the method of selecting features of the present invention is disclosed herein using the following terms, terminology, definitions and abbreviations:

The term "automatic" or "automatically" refers to a process of steps and/or act(s) performed by electrical, electronic or electromechanical devices, mechanical devices, machine or systems (including the system of the present invention) in response to information inputted into such machines, devices or systems.

The communication network is any digital or analog network or any combination of such networks whereby transmission of sensitive information can be achieved.

An owner/controlling entity of the communication system is able to completely operate and/or control the operation of the equipment in any appropriate manner as deemed warranted by such entity or its agent. A legal entity such as a person or a corporation or any defined entity can own the equipment or control the equipment at any time or only during certain time periods.

User profile information (inputted by user desiring to subscribe to services provided by the system) is identification information and relevant personal information of a user. The inputting of information is mostly implemented with GUI (Graphical User Interface) interfaces that are used to prompt a registering user to input particular profile information. The profile information may include information that is unique to the subscriber to allow the communication system to authenticate the subscriber at a later time. Examples of user profile information include a user's name, email address, phone number, cell phone number, and a MAC (Media Access Control) address of the user device being used by the user. The MAC is used as part of the user device information, which includes the IP address of the device and other information that define and identify the specific device used by a user during registration.

The term user refers to any entity (i.e., person, legal entity) capable of subscribing to the services being provided by the system of the present invention. A user selects the features being provided by the system of the present invention. A user also includes a person or entity who is using the services of the system via one or more communication networks accessible to that person or entity. A user may be a person who has not completed registration or a person who has not registered at all.

A user who has provided personal information, user profile information and user authentication information in response to prompts and queries from the system during registration becomes a registered user. A registered user may, at any time, be given the opportunity to input additional appropriate information related to the types of services for which he/she desires.

User authentication information of a registered user confirms the identity of the user. The authentication (or authentication procedure) is the act precedent to giving a registered user access to the system based on at least some of the user profile information inputted during the registration process (or at a later time) of the registered user or potential registered user. In addition to profile information, unique information (e.g., password, username, answers to specific personal questions), of the user or registered user is typically used to allow the system to provide access to a registered user and provide agreed upon services to the registered user. The terms "user authentication information" and "authentication information" will hereinafter be used interchangeably.

A Server is a computer or computer system comprising one or more processors, various blocks of memory, and supporting circuitry to process information and to interface with users, devices (including desktop or laptop computers, tablets, portable communication devices) or other servers.

The term "couple" or "couple(d) to" as used herein refers to a path or a series of connected paths (permanent or temporary) that allows information (in one or more formats) or signals to flow from one point or equipment in a communication network to another point within the same equipment or another equipment in the same or different communication network in accordance with the protocol(s) of the communication network(s).

A communication portal refers to a user accessible communication access point to which or from which users convey (i.e., transmit and/or receive) information regarding the type of service they desire or to register into a system. The communication portal can be part of the system or be coupled to equipment of the system. The communication portal can be part of another network that is in communication with the system. The portal can be a website on the Internet or a toll free number serviced by agents of the system. One example of a communication portal is a publicly accessible website residing on a server or other equipment of the system that allows users to register for the service(s) being offered by the system.

Internet enabled devices are devices such as laptops, telephones, cellular phones (e.g., smart phones), tablets, desktop computers and other communication devices capable of gaining access to the Internet through the use of Internet browsers such as Explorer, Safari, Firefox, Windows Mobile, Netscape Navigator, Lynx, Symbian, and receive information not only in their original formats, but also in Java, Flash, HTTP/S, TEXT and XML formats which are typically used by the Internet and Internet enabled devices.

The system of the present invention provides a system comprising a controlling server in communication with a controlled server via a socket communication channel allowing the controlling server to provide for viewing, in a secured manner, information in streaming format to the controlled server via the socket communication channel in response to continuous transmission of request signals transmitted by a user device to the controlled server via a communication channel where the controlled device relays the request signals to the controlling server via the socket communication channel. The controlled server also relays the information, in streaming format, from the controlling server to the user device via the communication channel allowing an operator of the user device to view the information in a secured manner. The terms "in streaming format; stream(s);" refer to the continuous transmission of the information to the user device and that the information cannot be stored once received by the user device or any other device or system through which it is transmitted and received. Thus, to be able to view the information it is continuously transmitted and when the streaming (i.e., the continuous transmission) is stopped or at least interrupted, the information no longer exists in the devices that have received it or through which it has passed. The information cannot be stored at any of intervening devices because it is contained within applets and/or servlets that traverse from one device to another and ultimately to a destination device where the information is displayed for viewing. Thus, the information is part of a process or processes temporarily residing in the intervening devices at least during the transmission of the information. The controlling server or the controlled server downloads the processes onto the devices during transmission of the information or immediately prior to the transmission of the information. A user wishing to view the information operates the user device to generate the request signals for specific information. Prior to providing the requested information for viewing, the controlling server first authenticates the user device (and thus also the user operating the user device) to confirm that the user device is registered in accordance with requirements set by the controlling server or the entity or entities in control of and/or are owners of the controlling server and the controlled server.

After having authenticated the user device, the controlling server, during the continuous transmission of request signals, provides for the display of the requested information and said information is also provided for display at the controlled server, also in streaming format, via the socket communication channel. The controlled server relays the displayed information to the user device, which displays said information, in streaming format, and thus allows the user to view the information in a secured manner; the information is relayed preferably in encrypted format. Any interruption of the continuous flow (i.e., continuous transmission) of request signals from the user device will cause the controlling server to immediately terminate the display of the information to its display, to the display of the controlled server and thus to the display of the user device. Upon resumption of the continuous transmission of request signals for the secured information within a defined time period, the controlling server may resume the display of the requested information. If, however, the occurrence of continuous requests for information resumes after the defined time period has elapsed, the controlling server may require that the user and user device proceed to a user and user device registration and/or authentication procedure before it resumes displaying the information. The entity or entities that own the controlling server and the controlled server may set the defined time period. Alternatively, a user, during registration, may be given the choice to set the defined time period.

Also, during the display of the information on the user device, the user and/or any other operator of the user device are not able to copy, record or otherwise generate any type of facsimile of the displayed information with the use of the user device; this is because the controlled server and the controlling server allow a selected I/O (Input/Output) component of the user device—exclusive of any other I/O component of the user device—to transmit continuously the request for information (i.e., to transmit continuously the request signals). Thus, once an I/O component is being used to transmit continuously one or more requests for the information, such I/O component will be allowed to do so exclusive of the operation of any other I/O component of the user device. The controlling server, the user (during registration) or the controlled server may select the I/O component. The display of the information, in streaming format, at the user device is the result of streaming information that preferably may be video information, graphics information, textual information, audio information, other types of information or any combination thereof. As already explained above, the user device cannot store the streamed information it receives from the controlling server via the controlled server. The streaming of the information may be stopped when the continuous requests for information from the user device are interrupted as discussed above. That is, the interruption may result from the user inadvertently or intentionally stopping transmission of one or more requests for information or when the user (or another person) attempts to use or operate another I/O component (of the user device) while the selected I/O component (of the same user device) is being used to transmit continuously requests for information; in such a case, the user device will automatically stop transmitting the requests for information and in response, the controller will stop streaming the information to the controlled server and user device. Such an automatic stoppage of request transmissions may be based on processes or handlers residing on the user device that control operation of various I/O components of the user device. The automatic stoppage may be done by processes such as Java servlets or applets downloaded onto the user device during the registration process or immediately after the completion of the registration process. A resumption of the streaming of the information may occur after the controller server initiated an authentication procedure.

Thus, in one embodiment of the present invention where the information is available to the viewing public, but the service provider or owner/controlling entity is concerned with the unauthorized copying or downloading of the information (e.g., video information, graphical information, textual information, alphanumerical information, audio information) at the user device, the present invention (i.e., controlling server 102, for example) will prevent such unauthorized copying or downloading of the information because one or more processes (in the form one or more applets or servlets) downloaded onto the user device (by the controlling server) requires continuous operation of a selected I/O component and prevents any simultaneous operation of the selected user device I/O component and another I/O component of the user device. When a user, while operating the selected I/O component of the user device to transmit continuous requests for the information, attempts to operate another I/O component to copy or download the information being displayed, the transmissions of the continuous requests, by the user device, automatically stop causing the controlling server to stop transmitting the requested information. In this embodiment, a viewer can visit a website (i.e., site accessible via the Internet) residing at the controlled server or the controlling server and need not register or login or provide a username. The site may contain videos, audio information, music, graphic information including but not limited to graphic designs, graphic art, paintings and other information that can be readily viewed by any member of the public. However, although the video, and graphical information can be viewed, copying or downloading of such information is prohibited. To prevent such downloading or copying, a user has to operate the selected I/O component (in this case, for example, the mouse) to continuously transmit a request to view, for example, a particular video. While the video is being viewed, the user has to continuously operate the mouse (e.g., pressing on a button of the mouse or pressing on the depressible portion of the mouse) in a manner defined by the controlling server and any other operation of any other I/O component (e.g., keyboard, second mouse, touch screen, insertion of a zip drive, flash drive or thumb drive into a USB (Universal Serial Bus) port, a stylus, a switch or actuator, the act of repositioning or reorienting of the device to cause a change in the display) while the mouse is being operated will cause the continuous transmissions to stop and thus cause the controlling server to stop transmitting the video. Also, any interruption in the operation of the mouse will also cause the server to stop transmitting the video. Continuing our example of the video, upon stopping the streaming of the video, the controlling server may require that the user return to the site and re-access the video (or generally speaking, re-access the requested information to be viewed).

In another embodiment of the present invention, the user device is a desktop computer or laptop computer. The information may be, for example, textual information, graphical information, alphanumeric information or video information. The controlled server may be in communication with the user device through a communication channel that is part of a communication network such as the Internet. Further, in this embodiment, the selected I/O component of the user device may be a mouse that controls the position of a cursor appearing on the display of the desktop computer or laptop computer. A user or organization gains access to the controlled server via a website on the Internet (residing on the controlled server) and registers for the service being provided by the controlled server and the controlling server. The controlling server may not be accessible via the Internet. A user, after having registered with the controlled server and after having identified the particular set of information he/she wants to be stored by the controlling server will transfer (preferably in encrypted format) the information to the controlled server which relays said information to the controlling server. The user also will have provided user authentication information, user device information, user profile information to the controlled server to allow the controlling server to verify the user device and its authentication information before providing access to the secured information; other types of information may be provided to the controlled server and thus ultimately to the controlling server. Upon receipt and storage of the information, the controlling server may uniquely identify the stored information and associate said information with the user device, the user information and the authentication information all of which having been provided during the registration process. The unique identifier(s) associated with specific stored information is provided to the user device and thus to the user after such information has been properly downloaded onto the system (i.e., onto the controller server and/or the controlling server).

After having registered, when a user wishes to view information (stored at the controlling server or information stored in memory accessible to the controlling server) he/she is able to do so by first identifying the information to the controlled server and providing authentication information to the controlled server to gain access to the identified information. Upon verification by the controlling server of the authentication information received from the desktop computer or laptop computer, the user is prompted to operate the mouse in a specific manner to begin the viewing the information for which he/she requested. In particular, the user proceeds to continuously depress at least one of the buttons of the mouse or continuously depresses a depressible portion of the mouse while moving the mouse to cause the cursor to be located generally near the center of the display screen. The continuous depression of the mouse and its movement causing the cursor to be located generally near the center of the screen results in a continuous flow of information being transmitted from the desktop computer or laptop computer to the controlled server via a communication channel over the Internet; the transmitted information may contain the coordinates of the location of the cursor and information indicating that the mouse is being depressed. The communication channel between the user device and the controlled server may be implemented with the use of Java servlets that transport information between the user device (i.e., laptop or desktop computer) and the controlled server.

The flow of requests for information from the laptop or desktop computer is relayed to the controlling server via the controlled server using the socket communication channel. The controlling server then determines the location of the cursor and if such location is within the boundaries of the document for which the request is being made or within boundaries defined by the controlling server. That is, the controlling server determines the particular area of the screen that will be occupied by the document (when positioned at or near the center of the screen) and if the cursor is currently located within that area. If so, the controlling server will display or provide for display the image of the document resulting in such document being displayed by the controlled server. The controlled server, using Java servlets, for example, then relays the image of the document to the user device (e.g., desktop computer or laptop computer). The document is displayed in this manner until the user moves the cursor to a left pointing or right pointing arrow indicating to the servers that he/she wants to view the preceding or successive page (if any) of the document. In this manner, the user can view an entire document and any other documents for which he/she has permission to view.

The controlling server is continuously streaming the document to the user device via the controlled server as long as one of the buttons of the mouse is being depressed or a depressible portion of the mouse is being depressed. Generally speaking, the controlling server will transmit for viewing the information as long as a designated or selected I/O component of the user device is being continuously operated (to transmit continuous request signals) in a manner defined by the controlling server.

Figure 1:
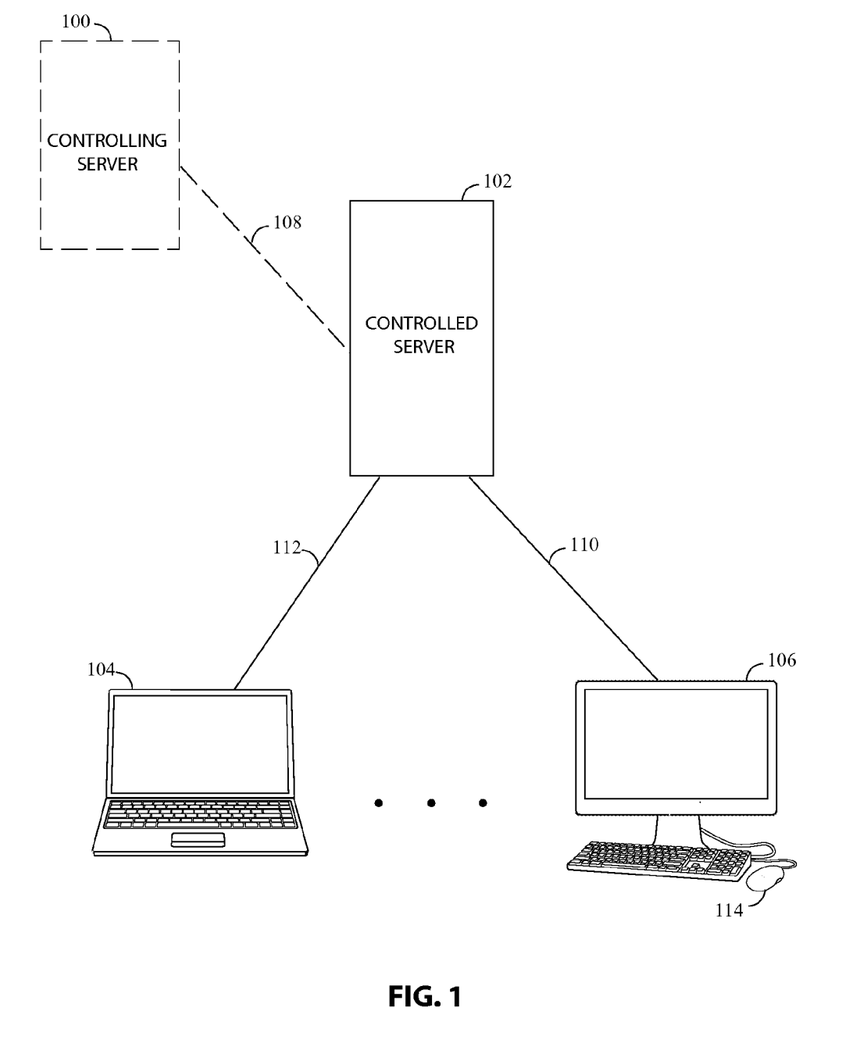
FIG. 1 shows one embodiment of the system of the present invention coupled to exemplary representations of communication devices.

Referring to FIG. 1, there is shown the system of the present invention comprising controlling server 100 coupled to controlled server 102 via socket communication channel 108. In the embodiment of FIG. 1, controlled server 102 is shown coupled to two user devices, viz., laptop 104 and desktop computer 106, via communication links 112 and 110 respectively. The communication links (or communication channels) 110, 112 are communication paths, which are part of a communication network such as the Internet (not shown for ease of explanation). It will be readily understood that the system of the present invention can serve more than two (2) communication devices at any one time. Two communication devices 104, 106 are shown for ease of explanation. Socket communication channel 108 is a two-way communication link with sockets as endpoints that allow processes (or application programs) running on the respective servers 100 and 102 to communicate each other. In particular, a process running on controlling server 100 is able to communicate with a process running on controlled server 102 by transmitting and/or retrieving information to/from a socket residing on controlling server 100. Similarly, a process running on controlled server 102 is able to communicate with a process running on server 100 by transmitting and/or retrieving information to/from a socket residing on controlled server 102. Each of the sockets is a software construct that is able to exchange information with the other socket as per a defined protocol where the information originates from a program or process running on the same or different network or machine. Thus, as shown in FIG. 1 socket communication channel 108 connects processes running on servers 100 and 102 respectively. The controlling server 100 and the socket communication channel 108 are shown in dashed lines to indicate that they may not be directly accessible through the network in which the controlled server and/or the user devices 104, 106 reside.

Controlled server 102 is able to communicate with user device 104 via communication channel 112 and also communicate with user device 106 (a desktop computer) via communication channel 110. The communication channels 110 and 112 can be implemented with Java® servlets that transport information between controlled server 102 and a user device. In the example shown in FIG. 1, user device 104 is a laptop and user device 106 is a desktop computer. It will be readily understood that the user devices capable of communicating with controlled server 102 may be devices (e.g., tablets, cellular phones) other than the ones shown in FIG. 1. Further, the user devices 104 and 106, the controlled server 102 and the communication channels 110 and 112 may be part of a publicly accessible communication network such as the Internet. Controlling server 100 along with socket communication channel 108 may or may not be directly accessible via a public communication network such as the Internet.

Controlling server 100, controlled server 102, socket communication channel 108 and communication channels 110 and 112 may be a communication system of the present invention that provides a service or services to which users can subscribe. The particular services that can be provided by such a system includes a method that allows users (e.g., operators of user devices 104 and 106) to (1) subscribe to the system (2) identify a particular document or documents for secured storage by the system and (3) be able to limit the viewing of the documents and information thereon (or to ascertain and be able to understand the information on the documents) to only authorized and authenticated users and prevent unauthorized access to the secured information.

Although not shown, another embodiment of the system of the present invention may include one server where such server performs the functions of both controlling server 100 and controlled server 102. The server is able to communicate (through a communication channel) with user devices in the same manner as controlled server 102. The server may have residing thereon several processes at least some of which are accessible via a public communication network such as the Internet. The communication channel may be implemented as a socket communication channel, a communication channel using servlets or applets or other type of communication channel. The communication channel may be a combination of the socket communication channel and the servlet or applet channels or may operate as one of such channels at different times.

A user can become a subscriber by accessing the system via the Internet. The system may, for example, have publicly available communication portals such as websites, which allow a user to register for the services being provided by the system. Part of the registration process includes the user entering into an agreement with the system owner and/or controlling entity to pay for the services to be provided by the system. Also, during the registration process, a user provides user profile information (e.g., user name, address, email address) and user authentication information (e.g., username, password, login information) to the system. In addition to the user profile and user authentication information, the user may provide identification information for the user device(s) under his/her control and with which he/she can communicate with the system to view information. Once a user or a user device has been properly registered, the system of the present invention will give the user specific instructions on how to download the various documents the user wishes to securely store in the system. Each document, which may comprise one or more pages of information or data in various formats (e.g., text, voice, video), is uniquely identified and logged by the system. A log comprising a list of unique identification of the documents downloaded by the user is provided by the system to the user after the completion of the downloading; that is, a unique identifier is associated with each document downloaded by the user to allow the user to identify the document when the user wishes to view the document at a later time. A user has the capability to download additional documents at any time while such a user is a properly registered user. Similarly, a user may remove previously downloaded documents at any time while the user is a properly registered user.

A user may be an individual, an organization comprising one or more persons or an automated system capable of retrieving, viewing and otherwise accessing automatically the secured documents. A user is able to operate a user device to access the stored information through the use of an I/O component of the user device. Such an I/O component (e.g., a mouse, certain keys of a keyboard, a stylus, touch activated screen or "touchscreen") can be defined or selected by the system or by the user during the registration process. For example, the system may query the user during the registration process as to the manner in which the user desires to retrieve, obtain, or access the stored information and providing one or more alternatives to the user at that point. Upon selection of an I/O component of the user device by the user, a process, which has been downloaded on the user device (through a Java servlet, for example) will control and monitor the operation of such I/O component to allow the user to view stored documents in a secured manner as will be explained below. The downloaded process may also have the effect of preventing the operation of more than one I/O component at a time. Alternatively, depending on the I/O component selected, the user device may already have an arrangement where operation of an I/O component precludes the operation of any other I/O component; any attempt to operate a second I/O component while a first I/O component is in operation will interrupt the operation of the first I/O component. For example, when user is using a mouse of a desktop computer, any attempt to simultaneously use the keyboard of that desktop computer will interrupt the operation of the mouse; the reverse is also true. That is, operation of the keyboard will be interrupted when an attempt to simultaneously use or operate the mouse is done. Most desktop computers have processes or handlers to service the operation of the mouse, the keyboard and other I/O components; these handlers typically interrupt operation of an I/O component when a user attempts to use another I/O component simultaneously.

Referring to FIG. 1, suppose for the sake of explanation a user operating desktop computer 106 wishes to store information in controlling server 100 or in a memory location accessible to controlling server 100. Suppose further that the user has already registered and provided user profile information, user authentication information and other types of information to the system. Also suppose that the mouse 114 has been designated (by the system or the user during registration) as the I/O component of desktop computer 106 that is to be used to send information request signals. Desktop computer 106 is an Internet enabled device because it has a well-known and established Internet browser software installed thereon. In order to view the stored information, the user would first have to navigate to a communication portal (e.g., a website) of the system. The website may, for example, reside on the controlled server 102.

At the communication portal, the user would log in using a username and password, which are part of the user authentication information and/or user profile information provided by the user to the system during registration or during an edit of the registration information. After logging in with the username and password, the user is prompted by controlled server 102 to enter the unique identifier of the document(s) the user wishes to view. Such identification(s) or a list thereof would have been downloaded to the user after downloading the document onto the system. Thus, a user may have a list of documents each of which has a unique identifier associated with it. Upon entering the unique identifier of the document, the controlling server 100—through the socket communication channel, controlled server 102 and communication channel 110—causes a blank screen to be displayed at the controlled server and at desktop computer 106. The cursor is the only object, at this point, that can be seen on the blank screen and the user may position the cursor on the display by manipulating the mouse. The system will then instruct the user to continuously press one of the buttons of the mouse or press continuously a depressible portion of the mouse surface while positioning the cursor at a general location identified by the system. For example, the system may display a colored or highlighted circular region within which the cursor is to be positioned. Once the cursor is positioned within the region, the controlling server 100 detects this (through cursor coordinates being transmitted to the controlling server) and streams the requested information onto the screen of the user device; in this case the information is streamed onto the screen of desktop computer 106. The displayed information is not stored by the desktop computer 106.

Figure 2:
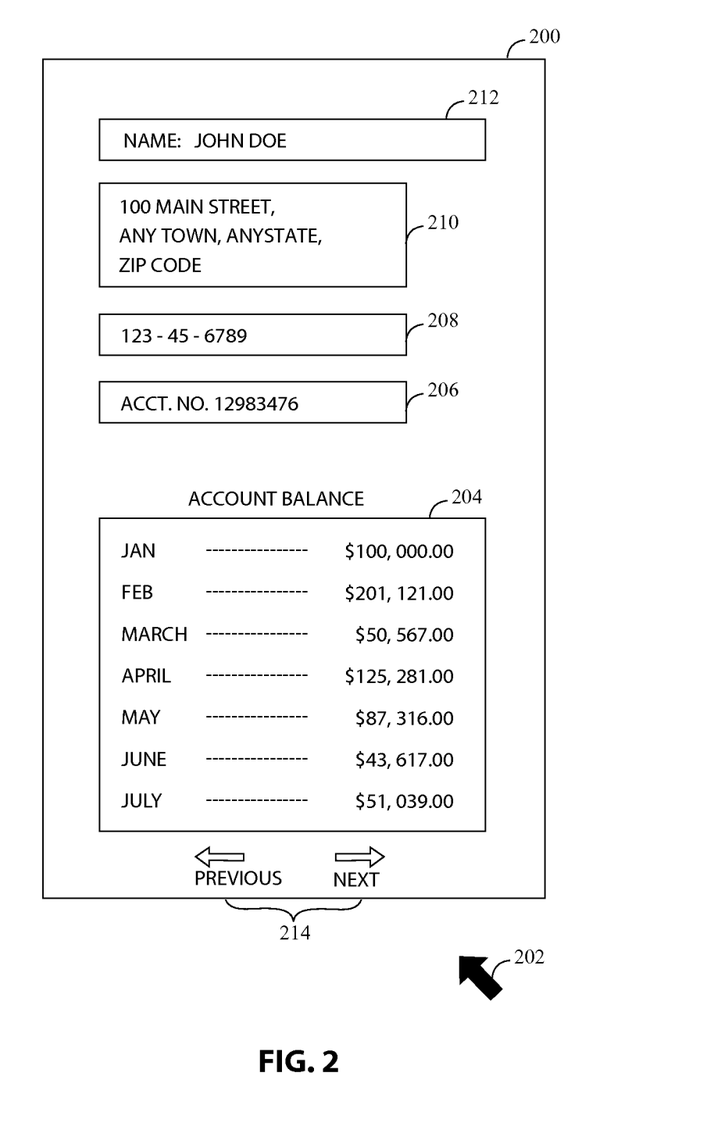
FIG. 2 shows one example of how information is displayed in accordance with one embodiment of the system of the present invention.

Referring now to FIG. 2, there is shown the first page of a particular document that has been requested by a user operating desktop computer 106. The document 200 represents a listing of sub-account balances of a person having a bank account at a particular bank. The document is a form having several defined fields in which various types of information are stored. A copy or image of the document is displayed at the screen of desktop computer 106. The documents requested by a user and the information stored therein can be displayed in a secured manner using various approaches. For example, in one embodiment of the present invention, the document when initially displayed is shown with all the fields displaying the information stored therein. As long as the user is continuously depressing a button of the mouse 114 (or a depressible portion of the mouse 114), and maintains the cursor within a general area defined by the controller server 100, the server 100 will continue to receive the request signals, which it deems proper, from desktop computer 106 and thus continue to stream an image of the documents to the screen of desktop computer 106. The user can move the cursor 202 to touch either of the arrows 214 to view either the next or previous page (if any) of the document 200. Document 200 has five (5) fields comprising field 212 wherein the name of the person having and account and various sub-accounts at a bank is stored; field 210 contains the address of the person; field 208 contains the social security number of the person; field 206 has the account number of the person and field 204 contains an updated list of the balances of various sub-accounts for that person. The cursor 202 is shown located near the displayed document. The cursor can be moved to arrows 214 and caused to touch either the left pointing or right pointing arrow to view a previous or next page of the document 200.

Figure 3:
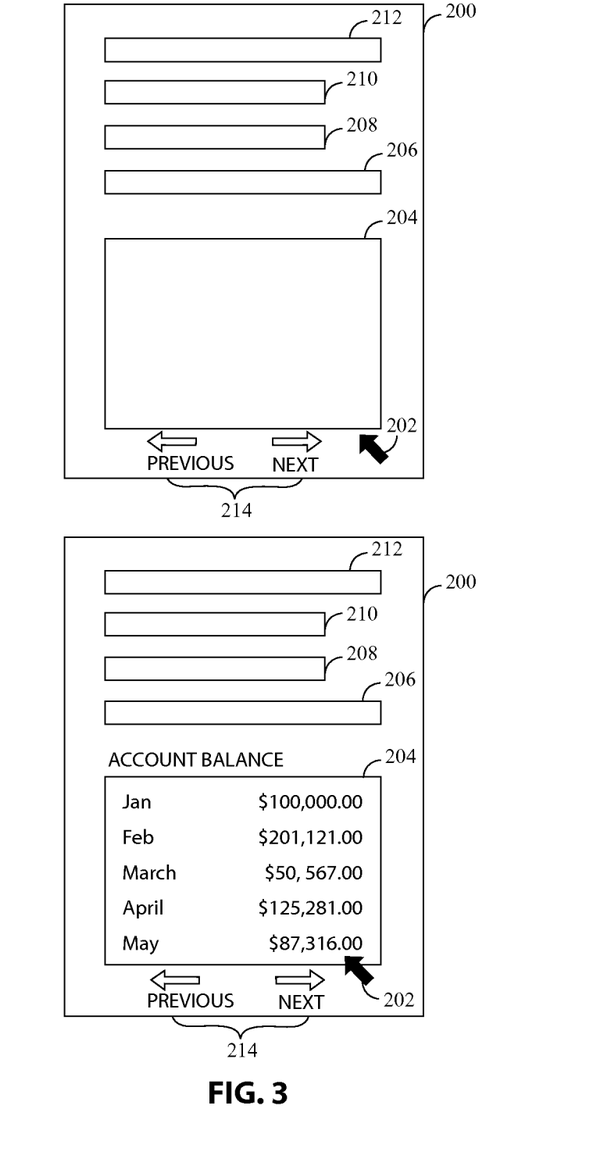
FIG. 3 shows two drawings of the form of FIG. 2 and how information can be displayed and viewed.

Referring now to FIG. 3 there is shown the same document, but in this embodiment of the present invention none of the information stored in the various fields are shown unless the cursor or at least a portion of the cursor is positioned within a field. The top drawing of FIG. 3 shows document 200 but with no information being displayed; this is because the cursor 202 is not positioned within any of the fields of the document 200. However, as is shown in the bottom drawing of FIG. 3, cursor 202 has been positioned so that a portion of it lies within field 204. As a result, the information within field 204 is displayed and can be viewed in this secured manner by an operator of desktop computer 106. As long as one of the buttons of mouse 114 is being depressed (or a depressible portion of mouse 114 is being depressed) while the cursor or at least a portion thereof is positioned within field 204, the proper request signals are being sent in stream fashion to controlling server 100 causing the server to stream the pertinent portion of the document as discussed above.

Figure 4:
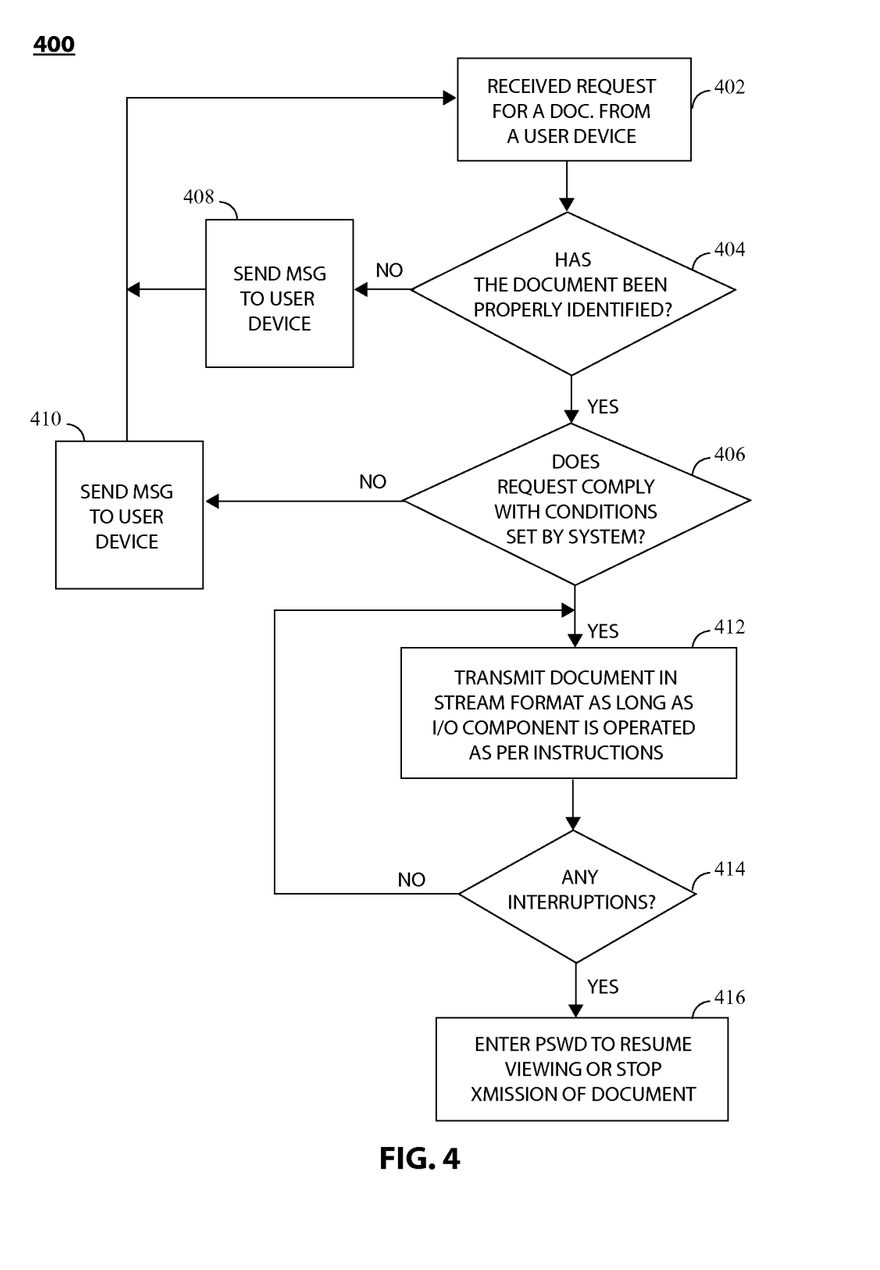
FIG. 4 is a flow chart of the method of the present invention.

Referring now to FIG. 4 a flowchart 400 depicting the steps of the method of the present invention is shown. The steps are performed by servers 100 and 102 as shown in FIG. 1 or a server (not shown) that performs the functions of both servers 100 and 102. For ease of explanation, the method of the present invention will be described in the context of the system shown in FIG. 1 where desktop computer 106 is being used to access the system through the use of a website associated with the system of the present invention. That is, controlled server 102 may have a website residing thereon that allows a user to have access the system of the present invention as shown in FIG. 1. It should be noted, however, that the method of the present invention can be implemented with a system other than the one shown in FIG. 1. For example, a system in which there is one server that is coupled to a plurality of user devices via socket communication channels or applets or servlets can also be used to perform the steps of the method of the present invention.

In step 402, controlling server receives a request for a specific document. In particular, an operator of desktop computer 106 accesses the communication portal for the system and logs in to the site using user authentication information. Once logged in, the user can select and specifically identify the document he/she wants to view. After having identified the document, the controlled server 102 (on which the site may reside) sends a message to controlling server 100 alerting the server 100 that a request for information has been made. Further, the controlled server 102 identifies the particular document and also sends that information to the controlling server 100. Having received a request for a document, the method of the present invention as performed by controlling server 100 and controlled server 102 (or one server performing the functions of both servers 100 and 102) moves to step 404.

In step 404, the controlling server 100 confirms the identification of the document for which there is a pending request. In particular, the controlling server accesses its list of stored secured information and the unique identification (or identifier) that it generated for the document during registration. As explained previously a registered user is able to download onto the system document(s) (generally, information) in various formats. Once properly downloaded, the system generates a unique identifier for a document and provides that identifier to the user. The user can then uniquely identify the document at some later time when the user wants to view the document in the manner provided by the system of the present invention. If the document has not been properly identified meaning the user has entered an erroneous identifier or the identifier entered by the user is not associated with said user, the method of the present invention as performed by the controlling server 100 moves to step 408 where the controlling server send a message to the user device informing the user that the identifier entered has not been found and that the user should confirm that he/she entered a valid document identifier. The user may be invited to contact the staff of the system either by phone or by email to correct this situation; the user may be given another opportunity to enter the correct identifier prior to contacting system staff. If, however, the identifier entered by the user has been confirmed by the controlling server 100, the method of the present invention moves to step 406 after such a document was downloaded by a user.

In step 406, controlling server 100 monitors whether it is receiving continuous requests from the user device that requested the identified document. More specifically, prior to monitoring the continuous signals from user device (desktop computer) 106, controlling server 100 sends instructions to desktop computer 106 as to where cursor 202 of the desktop computer 106 is to be positioned. Controlling server 100 can send a graphics (highlighted circle for example) to highlight the area in which the cursor is to be positioned. In general, controlling server 100 can set certain conditions that are to be met by the user in terms of the location of the cursor and how the mouse is to be manipulated before it starts to stream a copy of the document(s) to desktop computer 106. At this point, the user is continually pressing the mouse 114 causing continuous transmissions from user device 106 to controlling server 100 via communication channel 110, controlled server 102, and socket communication channel 108. Controlling server 100 is able to detect the continuous transmission, which include coordinates of the location of the cursor 202 (see FIGS. 2 and 3) as it is moved using mouse 114 (see FIG. 1). If after a first defined time period for initiating transmission, the cursor is not positioned at the proper location on the screen as required by controlling server 100, the method of the present invention moves to step 410. In step 410, the controlling server 100 sends a message to the user device (i.e., desktop computer 106) informing desktop computer 106 that transmission of the requested document cannot commence until the conditions set by controlling server 100 are met (e.g., cursor is positioned properly). Further, if after a second defined time period for initiating transmission, the cursor is still not properly positioned, controlling server will terminate the process requiring the user to restart the process by resending the request and the method of the present invention moves to step 402. If, however, the cursor is positioned as per the instructions of controlling server 100, the method of the present invention moves to step 412.

In step 412, the requested document is being streamed to the desktop computer 106 as long as the user is depressing continually one of the buttons on mouse 114 or a depressible portion of mouse 114. The document may have different fields with the information stored in all the fields shown simultaneously or the information in the field wherein at least a portion of the cursor is currently positioned is the only information that is displayed and is viewable. The display of the document can be interrupted or terminated if (i) the user stops pressing on the depressible portion of the mouse intentionally or inadvertently (for example, the user may have walked away from the desktop computer to attend to an unexpected event without giving thought to temporarily stopping the streaming of the sensitive information he/she is currently viewing); (ii) either the user or the user device attempts to perform a function using an I/O component (e.g., keyboard, copying contents of screen) of the desktop computer 106 during the continuous transmission of request signals using the designated or selected I/O component (e.g., mouse 114) of the desktop computer 106; (iii) the user has indicated to the controlling server 100 that he/she wishes to terminate viewing of the information; or (iv) transmission is interrupted due to a technical problem in either the socket communication channel 108 or communication channel 110. The display of information can be interrupted or terminated by the controlling server 100 based on interruptions in the request signals (button or depressible portion of mouse 114 not being depressed due to user waking away unexpectedly from desktop computer 106) being received by the controlling server 100 or by the attempted use of another I/O component (in addition to the mouse 114) of the desktop computer 106. An I/O component of desktop computer 106 (or generally, of a user device) is any user accessible or interface portion of the user device that is used to input data, copy data or output data from the desktop computer 106. During the viewing of information accessed and provided for display by controlling server 100, no other I/O component (other than the selected or designated I/O component) of the user device is allowed to perform any functions. In the example being discussed, the mouse is a selected I/O component because it is the I/O component that was used to make a request to view secured information. The controlling server may select the I/O component or allow the user to select the I/O component during the registration process. No other I/O component can be used while the continuous request for information is being made; this is to prevent any copying, recording or generation of any facsimile of the information being viewed. A user viewing the requested information may decide to interrupt the continuous flow of request signals by no longer depressing the mouse 114 causing the controlling server to experience an interruption in the continuous reception of request signals. Alternatively, the controlling server 100 may no longer be receiving input signals requesting information for a variety of reasons as discussed above.

In step 414, the controlling server monitors for any interruption of input request signals from desktop computer 106. As soon as the transmission of input request signals from the mouse 114 is interrupted, the controlling server 100 immediately stops streaming the requested information (information is no longer being displayed) and starts a timer and the method of the present invention moves to step 416. Transmission of the document is interrupted; that is transmission postponed or is stopped temporarily.

In step 416, if prior to a first time period elapsing, the transmission of request signals is detected by the system, the user is requested to enter a password (or enter other authentication information in addition to or instead of the password) before he/she is allowed to resume viewing the requested information. For example, if the user unexpectedly had to walk away from the desktop computer 106, but was able to return prior to the expiration of the first time period, the user can enter the password to resume viewing the document. After a second defined time period elapses, transmission is terminated instead of being postponed. The viewing session is ended by the controlling server 100 and the user is requested (through instructions sent to the desktop 106 by the controlling server 100) to return to the website and log in and once again specify the particular document he/she wants to view using the specific unique identifier provided by the controlling server 100 during the registration process; in this case the user will have started the viewing process anew (i.e., re-initiate the viewing process) by returning to step 402 of the method of the present invention. The first and second defined time period are set by the system, i.e., the controlling server. Alternatively, the system may give a user the opportunity to set the first and/or second defined time period during the registration process.

The system and method of the present invention has been described using communication devices such as the ones depicted in FIG. 1. However, the method and system of the present invention is not limited desktop computer computers and laptops. Any Internet enabled device such as mobile phones, tablets and other devices (portable and non-portable), which can communicate over public communication networks to which the system of the present invention is coupled can be used to exchange sensitive and private information in the manner discussed above. Indeed, subscribers of the system of the present invention may, via the controlling server, transmit sensitive information to mobile users in text format, for example. In particular, a mobile user may receive a text from controlling server 100 where the text contains a URL (Uniform Resource Locator) that leads to the actual text message. That is, the URL is a location in the Internet where the sensitive information can be read by the mobile user. The same or different URL can be used by the controlling server to receive a reply message from the mobile user; i.e., the mobile user's reply to the server; the reply is in fact a reply to the registered user who sent the original message via the controlling server.

The mobile user can read the sensitive information located at the URL either by (i) downloading an App that can access the information stored at the address of the URL or (ii) the URL is a web page that displays the message and gives the mobile user an opportunity to reply to the message. The reply message from the mobile user is stored at the URL and may be retrieved by the controlling server. The sensitive information at the URL is encrypted, but will be displayed to the intended recipient (i.e., the mobile user) in decrypted form to allow the mobile user to read the message. The message sent by the controlling sever to the URL is not stored anywhere other than the URL. Also, the information transmitted by the mobile user through the URL location is not stored anywhere. The messages either from the controlling server or from the mobile user are located at the URL and can be seen by the mobile user and controlling server respectively. No messages are stored at the mobile or at the server. The messages are present are the URL for a defined period of time, and are streamed to the mobile user or controlling server and then disappear. Indeed, the controlling server and the mobile user are allowed to view the messages during the time it takes to stream the messages to them and then the messages expire. The mobile user does not have any direct interaction with the controlling server and vice versa. In this manner, text messages temporarily located at a URL can be viewed by the intended recipient for relatively brief periods and then are permanently removed from the URL.

While various aspects of the present invention have been described above, it should be understood that they have been presented by way of example and not limitation. It will be apparent to persons skilled in the relevant art(s) that various changes in form and detail can be made therein without departing from the spirit and scope of the present invention. Thus, the present invention should not be limited by any of the above-described exemplary aspects, but should be defined only in accordance with the following claims and their equivalents.

In addition, it should be understood that the figures in the attachments, which highlight the structure, methodology, functionality and advantages of the present invention, are presented for example purposes only. The present invention is sufficiently flexible and configurable, such that it may be implemented in ways other than that shown in the accompanying figures.

What is claimed is:

1. A method for displaying information by a controlling server of a system where the system comprises the controlling server coupled to a controlled server via a socket communication channel, the method comprising:
    transmitting, in streaming format, by the controlling server, information in response to the controlling server receiving, from the controlled server, continuous requests over the socket communication channel from a user device via the controlled server wherein said continuous requests result from operation of a preselected I/O component of a user device and are based on at least conditions set by the controlling server for displaying the information wherein the I/O component was selected in one of (i) during user registration: (ii) by the controlling server; and (iii) by the controller server; and
    interrupting, by the controlling server, the transmission of the information upon the controlling server detecting an interruption in the reception of the requests.

2. The method of claim 1 where the step of transmitting comprises:
- providing, by the system, a communication portal for registering for services being offered by the system;
- receiving, at the communication portal user authentication information, user profile information and user device information during registration;
- providing, by the controlling server, upon completion of registration, unique identifiers for each of the information intended to be stored in the system and displayed by the system; and
- selecting, by the controlling server, an I/O component with which continuous requests for the information to be displayed is to be performed.

3. The method of claim 2 where the step of selecting an I/O component comprises the controlling server selecting the I/O component.

4. The method of claim 2 where the step of selecting an I/O component further comprises downloading, by the controlling server during registration, processes to provide for exclusive use of the selected I/O component.

5. The method of claim 2 further comprising the step of transmitting instructions on how to manipulate the selected I/O component upon verification of the received user authentication information.

6. The method of claim 1 where the step of transmitting the information further comprises the controlling server first transmitting instructions setting conditions for enabling the transmission of the information for display.

7. The method of claim 1 where the step of interrupting transmission of the information comprises:
- stopping, by the controlling server, the transmission of information;
- requesting, by the controlling server, entry of user authentication information for resumption of transmission of the information for display; and
- resuming, by the controlling server, transmission of the information for display upon receiving user authentication information and upon receiving, by the controlling server, continuous requests for the information for display prior to a first defined time period expiring.

8. The method of claim 7 where the first defined time period is set by the controlling server.

9. The method of claim 7 where the first defined time period is set during registration.

10. The method of claim 1 where the step of interrupting the transmission of the information comprises:
- stopping, by the controlling server, the transmission of the information for display after expiration of a second defined time period; and
- resuming, by the controlling server, the transmission of the information for display upon receiving authentication information and a unique identifier for the information for display from a communication portal of the system.

11. The method of claim 10 where the second defined time period is set by the controlling server.

12. A system for displaying information remotely in a secure manner, the system comprising:
- a controlling server;
- a controlled server in communication with the controlling server via a socket communication channel and where the controlled server is coupled to a communication channel of a communication network through which information for display from the controlling server through the socket communication channel, the controlled server and the communication channel is transmitted in streaming format based on the controlling server receiving continuous requests for the information wherein said continuous requests result from operation of a pre-selected I/O component of a user device and are based on at least conditions set by the controlling server for displaying the information wherein the I/O component was selected in one of (i) during user registration: (ii) by the controlling server; and (iii) by the controller server.

13. The system of claim 12 where the socket communication channel has a socket at the controlling server and another socket at the controlled server thus allowing processes running on the controlling server to communicate with processes running on the controlled server.

14. The system of claim 12 where the controlled server has a communication portal residing thereon and coupled to a communication network providing access to the system and allowing registration into the system.

15. The system of claim 14 where the communication portal is a website and the communication network is the Internet.

16. The system of claim 12 where the controlling server and the controlled server are part of different communication networks.

17. The system of claim 12 where the controlling server is not publicly accessible.

18. A method for preventing copying of information being displayed at a website residing on a controlling server, the method comprising:
- downloading onto a user device, by the controlling server via a communication socket, a controlled server and a communication channel of a communication network, one or more processes requiring continuous exclusive operation of a pre-selected I/O component of a user device for continuous requests for accessible information stored at the website and accessible at the controlled server via the communication channel;
- transmitting, in streaming format, by the controlling server, information in response to the controlling server receiving continuous requests for the information where the continuous requests result from operation of the pre-selected I/O component of a user device and are based on at least conditions set by the controlling server for displaying the information wherein the I/O component was selected in one of (i) during user registration; (ii) by the controlling server; and (iii) by the controller server and
- stopping, by the controlling server, the transmission of the requested information upon the controlling server detecting an interruption in the received continuous requests for information.

19. The method of claim 18 where the requested information resides at the controlling server.

20. The method of claim 18 where the requested information is a video.

21. The method of claim 18 where the requested information is graphic art.

22. The method of claim 18 where the requested information is music.

23. The method of claim 18 where the requested information are paintings.

* * * * *